(12) United States Patent
Banister (10) Patent No.: US 6,928,775 B2
(45) Date of Patent: Aug. 16, 2005

(54) MULTI-USE ELECTRIC TILE MODULES

(76) Inventor: Mark P. Banister, 6550 E. Miramar Dr., Tucson, AZ (US) 85716

( * ) Notice: Subject to any disclaimer, the term of this patent is extended or adjusted under 35 U.S.C. 154(b) by 2 days.

(21) Appl. No.: 10/222,483

(22) Filed: Aug. 16, 2002

(65) Prior Publication Data

US 2004/0031219 A1 Feb. 19, 2004

(51) Int. Cl.[7] .......................... E04D 13/18; E04H 14/00
(52) U.S. Cl. ...................... 52/173.3; 136/244; 136/251; 362/84
(58) Field of Search ............................... 52/173.3, 177, 52/220.1, 220.2; 136/244, 251, 253, 291; 362/84, 24, 26; 174/50, 48, 59

(56) References Cited

U.S. PATENT DOCUMENTS

| | | | |
|---|---|---|---|
| 4,189,881 A | * 2/1980 | Hawley | 52/91.3 |
| 4,233,653 A | * 11/1980 | Jongerius et al. | 362/84 |
| 4,321,416 A | 3/1982 | Tennant | |
| 4,419,530 A | * 12/1983 | Nath | 136/251 |
| 4,860,509 A | 8/1989 | Laaly et al. | |
| 5,011,544 A | * 4/1991 | Gaddy et al. | 136/246 |
| 5,022,381 A | * 6/1991 | Allegro | 126/622 |
| 5,070,431 A | * 12/1991 | Kitazawa et al. | 362/31 |
| 5,090,167 A | 2/1992 | Wassell | |
| 5,232,518 A | * 8/1993 | Nath et al. | 136/251 |
| 5,316,592 A | 5/1994 | Dinwoodie | |
| 5,338,369 A | 8/1994 | Rawlings | |
| 5,437,735 A | 8/1995 | Younan et al. | |
| 5,573,600 A | * 11/1996 | Hoang | 136/248 |
| 5,575,861 A | 11/1996 | Younan et al. | |
| 5,590,495 A | 1/1997 | Bressler et al. | |
| 5,647,915 A | 7/1997 | Zukerman | |
| 5,830,779 A | 11/1998 | Bressler et al. | |
| 5,990,414 A | * 11/1999 | Posnansky | 136/244 |
| 5,998,729 A | * 12/1999 | Shiomi et al. | 136/251 |
| 6,063,996 A | * 5/2000 | Takada et al. | 136/246 |
| 6,075,201 A | 6/2000 | Wambach | |
| 6,092,587 A | * 7/2000 | Ingram | 165/56 |
| 6,111,189 A | * 8/2000 | Garvison et al. | 136/244 |
| 6,182,404 B1 | * 2/2001 | Rinklake et al. | 52/173.3 |
| 6,311,436 B1 | 11/2001 | Mimura et al. | |
| 6,323,478 B1 | 11/2001 | Fujisaki et al. | |
| 6,498,289 B1 | * 12/2002 | Mori et al. | 136/244 |
| 6,606,830 B2 | * 8/2003 | Nagao et al. | 52/173.3 |
| 6,617,507 B2 | * 9/2003 | Mapes et al. | 136/251 |
| 2002/0043277 A1 | * 4/2002 | Yamawaki | 136/244 |
| 2003/0140961 A1 | * 7/2003 | Damson et al. | 136/244 |
| 2003/0189823 A1 | * 10/2003 | George et al. | 362/84 |
| 2003/0217768 A1 | * 11/2003 | Guha | 136/244 |
| 2004/0000334 A1 | * 1/2004 | Ressler | 136/251 |

FOREIGN PATENT DOCUMENTS

| | | |
|---|---|---|
| EP | 0 798 787 A2 | 10/1997 |
| EP | 0 867 946 A2 | 9/1998 |
| EP | 0 917 209 A2 | 5/1999 |
| EP | 1 201 842 A1 | 5/2002 |
| WO | WO 98/13883 | 4/1998 |

* cited by examiner

Primary Examiner—Carl D. Friedman
Assistant Examiner—Chi Q. Nguyen
(74) Attorney, Agent, or Firm—Hayes Soloway P.C.

(57) ABSTRACT

A multiuse electric tile module for walling, flooring, or roofing applications having a photovoltaic cell, thermovoltaic cell, electroluminescent material, or a combination of these disposed over a rigid substrate, such as ceramic. Each tile is electrically connectable through a male-to-female connecter to at least one adjacent tile without external wiring. Preferably, a sealing layer is disposed over the electrical elements and rigid substrate to seal and protect each tile. Optionally, each tile may further include an inverter to convert direct current to alternating current or a battery to store electricity. The electroluminescent material provides light for architectural accents or nighttime visibility.

51 Claims, 7 Drawing Sheets fig. 1 fig. 2A fig. 2B fig. 6A fig. 6B

MULTI-USE ELECTRIC TILE MODULES

BACKGROUND OF THE INVENTION

1. Field of Invention

The invention generally relates to outdoor tiles for wall, roof and floor applications. More particularly, the invention relates to connectable tile modules that include electrical components, such as electroluminescent material, photovoltaic, or thermovoltaic cells.

2. Description of the Related Art

Providing electricity through photovoltaic and thermovoltaic cells is becoming more popular as these technologies have come down in cost and reliance on other sources of electric power is increasingly disfavored for environmental and strategic reasons. However, providing a general use tile with electrical components that is easy to install and electrically connectable to other tiles without external wiring has been elusive.

The conversion of electromagnetic radiation from thermal sources to electricity is known as thermophotovoltaic (TPV) power generation. While the overall thermal-to-electric conversion (TEC) efficiency of TPV systems has typically been lower than hoped for, recent developments in materials and techniques have changed the situation dramatically. Several rare earth oxides, for example, have been shown to have altered spectral distributions in their emission spectra, leading to a more efficient TPV operation. For example, GaAs, GaSb, InGaAs are used in thermoelectric applications.

Photovoltaics refer to cells that convert sunlight directly into electrical energy. The electricity is direct current and can be used that way, converted to alternating current through the use of an inverter, or stored for later use in a battery. Conceptually, in its simplest form, a photovoltaic device is a solar-powered battery whose only consumable is light. Because sunlight is universally available, photovoltaic devices have many advantages over traditional power sources. Photovoltaic systems are modular, and so their electrical power output can be engineered for virtually any application. Moreover, incremental power additions are easily accommodated in photovoltaic systems, unlike more conventional approaches such as fossil or nuclear fuel, which require multi-megawatt plants to be economically feasible.

Although photovoltaic cells come in a variety of forms, the most common structure is a semiconductor material into which a large-area diode, or p-n junction, has been formed. In terms of basic function, electrical current is taken from the device through a contact structure on the front that allows the sunlight to enter the solar cell and a contact on the back that completes the circuit.

The original and still the most common semi-conducting material used in PV cells is single crystal silicon. Single crystal silicon cells are generally the most efficient type of PV cells, converting up to 23% of incoming solar energy into electricity. These cells are also very durable and have proven their long life in many space related applications. The main problem with single crystal silicon cells is their production costs. Growing large crystals of silicon and then cutting them into thin (0.1–0.3 mm) wafers is slow and expensive. For this reason, researchers have developed several alternatives to single crystal silicon cells, with hopes of reducing manufacturing costs.

Alternatives to single crystal silicon cells include poly-crystalline silicon cells, a variety of "thin film" PV cells, and concentrating collectors. Poly-crystalline silicon cells are less expensive to manufacture because they do not require the growth of large crystals. Unfortunately they are less efficient than single crystal cells (15–17%). "Thin films" (0.001–0.002 mm thick) of "amorphous" or uncrystallized silicon are another PV alternative. These thin films are inexpensive, and may be easily deposited on materials such as glass and metal, thus lending themselves to mass production. Amorphous silicon thin film PV cells are widely used in commercial electronics, powering watches and calculators. The problem with these cells is that they are not very efficient (12% in the lab, 7% for commercial cells), and they degrade with time, losing up to 50% of their efficiency with exposure to sunlight.

Thin film PV cells made from other materials have also been developed in an attempt to overcome the inefficiency and degradation of amorphous silicon thin films, while retaining low production costs. Gallium arsenide (GaAs), copper indium diselenide ($CuInSe_2$), cadmium telluride (CdTe) and titanium dioxide ($TiO_2$) have all been used as thin film PV cells, with various efficiencies and production costs. Titanium dioxide thin films, just recently developed, are very interesting because they are transparent and can be used as windows.

In terms of artistic and practical applications (e.g. improved nighttime visibility), electroluminescent materials have become popular novelties. Electroluminescent materials, such as phosphor, emit light when a current is passed through it. Commercially available phosphor-based electroluminescent materials use, for example, zinc sulphide doped with manganese (ZnS:Mn) as amber-glowing phosphor. Making different-color luminescing material for artistic effect is a matter of blending elements that will electroluminesce with red, green, blue (or a combination of these) to make light of many different colors). For example, strontium sulphide doped with copper, denoted 'SrS:Cu' can be "tuned" by controlling the proportions of five-neighbored and six-neighbored copper by adding the elements sodium and yttrium to the material, tipping light emission toward the greens.

While electroluminescent building tiles are not known to exist in the related art, several examples of photovoltaic cells used on roof coverings are. For example, U.S. Pat. No. 4,321,416 issued to Tennant discloses a photovoltaic module in the form of a shingle having a mounting portion and flat, flexible leads extending from each module for connection to other flexible leads or to a separately wired electrical network. Furthermore, a photovoltaic shingle system is disclosed in U.S. Pat. No. 5,437,735. These shingles are made up of a strip of roofing material with photovoltaic generating devices adhered thereto. While each strip is electrically interconnected, external leads are necessary to carry electricity away from each strip. Additionally, U.S. Pat. No. 4,860,509 by Laaly et al. describes a flexible roofing membrane with photovoltaic cells incorporated therein. A final example of a solar roof assembly is found in U.S. Pat. No. 5,316,592 issued to Dinwoodie. This patent discloses a three-element assembly in which photovoltaic cells are disposed upon an insulating element that is placed upon a roof membrane. However, as with the interconnected roofing shingles above that are applied in rolls or strips, cosmetic or structural damage to one area necessitates that the entire section, rather than an individual module, be replaced.

While all of the building materials described above are suited for roof applications, none would be practical as flooring or for wall applications because of their external lead requirements, lack of rigidity, and/or unsuitable structural characteristics. Moreover, the bulkiness and expense of having separate photovoltaic regions and mounting regions can make some of these building materials economically unattractive and difficult to install. Furthermore, none of these inventions utilize a connectable rigid tile module with an electroluminescent material, a photo- and/or thermovoltaic cell, or a combination of these, to produce electricity and/or lighting effects. Thus, there continues to be a need for a novel and improved multiuse and connectable tile modules that (1) utilize sunlight and heat to produce and store electricity and/or lighting effects, (2) are easy to install, (3) have no external wiring requirements to interconnect with each other, (4) feature decorative illumination options, and (5) are commercially feasible to produce.

SUMMARY OF THE INVENTION

The invention meets the aforementioned need by providing a rigid, multi-use tile module that is electrically connectable to a surrounding tile through at least one male-to-female connector. In one preferred embodiment, the invention includes a combination of photovoltaic and thermovoltaic thin films disposed over a rigid substrate, such as ceramic, with each module being electrically connectable through a male-to-female connection along a side edge or a bottom tab to at least one adjacent module, thereby eliminating the need for a separately wired electrical network. In another preferred embodiment, the tile module of the invention includes an electroluminescent element to provide light for architectural accents or nighttime visibility. Moreover, each inventive module may further include an inverter to convert direct current to alternating current, a battery to store electricity, a sealing layer to protect the tile and its electrical components, and/or a reflective element.

The individual tiles may be connected to each other in series to form an array by simply connecting the male prong to a female socket of an adjacent tile or vice versa. Parallel, or combinations of serial and parallel, arrangements of tile modules are also contemplated through, for example, connecting the end of every row to a bus bar or cable and using non-conductive "dummy" tiles in alternate rows.

Definitions

The term "thin film" means micron-sized material deposited as a element over another conducting or non-conducting material.

The term "module" means a self-contained assembly of electronic components and circuitry.

The term "tile" means a piece of rigid material of the type traditionally used on roofs, floors, or walls and includes both substantially flat tile pieces as well as tile pieces that are curved in cross-section.

The term "thermovoltaic" is meant to encompass all known materials that convert heat into electricity, including thermoelectric material such as mercury cadmium telluride thermal diodes.

An object of this invention is to provide a multi-use flooring, roofing, and walling tile module that contains at least one electrical component comprising an electroluminescent material, photovoltaic element, a thermovoltaic element, or combinations thereof.

A second object of this invention is to provide a multi-use tile that is easy to install.

A third object of this invention is to provide multi-use tiles that do not require external wiring to electrically connect with each other.

A fourth object of the invention is to provide electrically connectable tiles that produce light for enhancement of nighttime visibility and/or decorative effect.

A fifth object is to provide a photovoltaic and thermovoltaic tiles that are simple and economical to manufacture.

The invention accomplishes these and other objects by providing a novel and improved tile module disposed with built-in electrical connectors and one or more electrical components.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and description disclose only some of the various ways in which the invention may be practiced.

DETAILED DESCRIPTION OF THE INVENTION

The invention, in general, provides a multipurpose, electrically connectable tile module that contains an electroluminescent, photovoltaic, and/or thermovoltaic element upon its upper side. Preferably, the electroluminescent and voltaic elements are electrically insulated and are sealed to the tile substrate by a glaze. Optionally, the tile module may also include a battery and/or inverter. The tile modules are electrically connected by "male-to-female" (e.g., prong and socket) connectors along a side edge or bottom tab to eliminate the need for external wiring between tiles. Accordingly, the tile modules can be used to provide interesting light effects and/or electricity in a variety of outdoor flooring, roofing, and wall facade applications.

Figure 1:
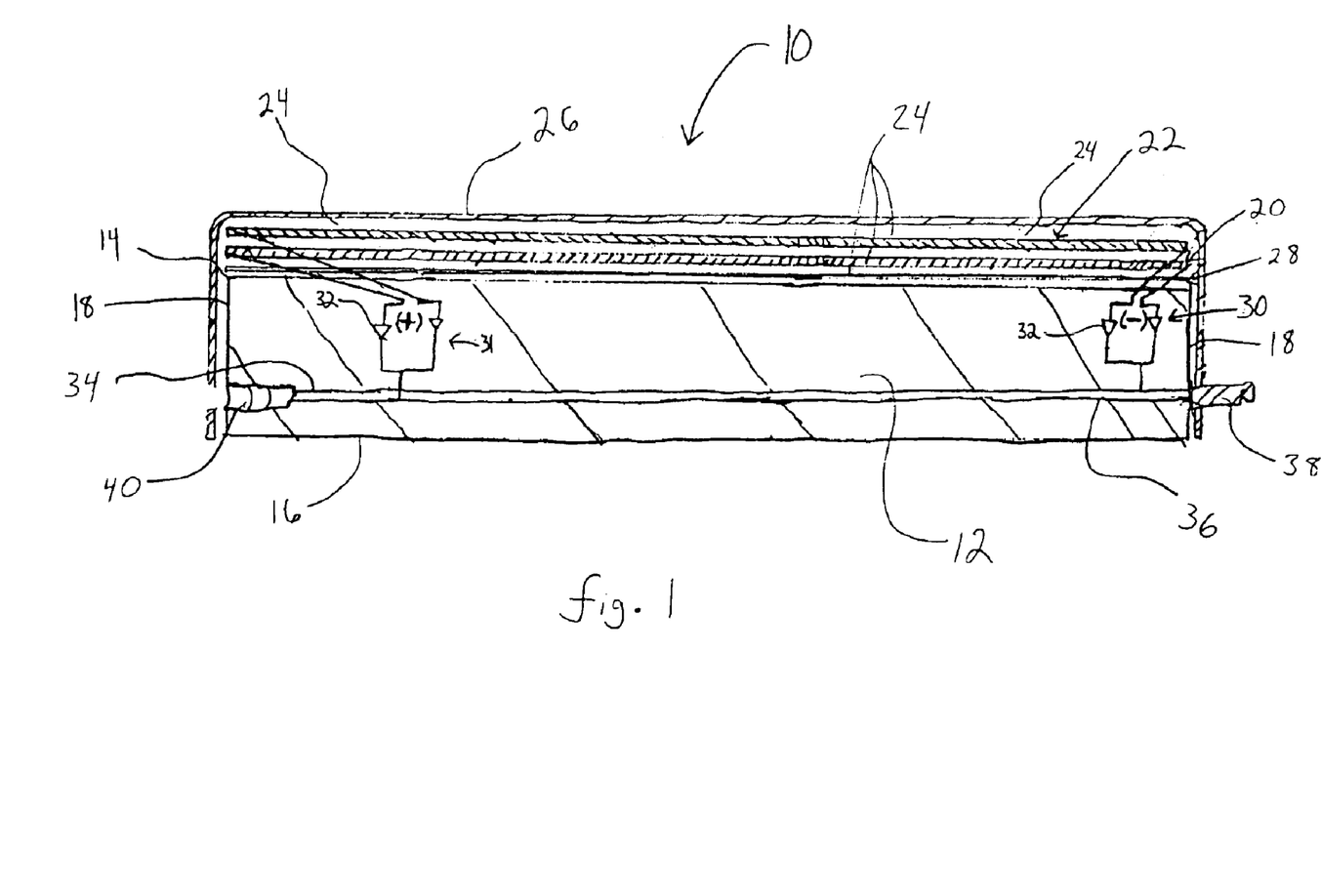
FIG. 1 schematically depicts a side view of an embodiment of the invention in cross-section.

Turning to an especially preferred embodiment in FIG. 1, the electric tile 10 includes a rigid substrate 12. Preferably, the rigid substrate 12 includes ceramic or cement. However, tiles may be made from other rigid materials, including, but not limited to, clay, mud, polymers such as a plastic, polymer/clay or polymer/ceramic hybrids, or glass. Whatever material is chosen, the rigid substrate 12 must be composed of an electrically insulating material to prevent short circuits among connected tiles modules. Rigid substrate 12 includes a top side 14, a bottom side 16, and side edges 18. Although a substantially rectangular shape for the rigid substrate is shown, it should be understood that the tile modules may assume any shape having top and bottom sides and one (e.g., circles) or more side edges (e.g., triangles, squares, hexagons).

Disposed over top side 14 are thermovoltaic element 20 and photovoltaic element 22. Elements 20 and 22 preferably comprise thin film thermovoltaic and photovoltaic cells because thin films are inexpensive and may be easily deposited on many different rigid materials by several different methods well known in the art. For example vacuum deposition, ion sputtering, and spin-coating methods may be used.

Preferably, elements 20 and 22 are coated with a transparent, electrically insulating material 24, such as silicon. Also preferably, the tile 10 is coated with a sealing layer 26. The sealing layer is designed to make the tile modules wear and weather resistant and may include, but is not limited to, fired ceramic glazes, liquid glazes, sol gels, polymer or glass-based coatings, thick films, or a combination of these. To enhance the efficiency of the thermovoltaic element 20, a heat-reflective element 28 may be disposed on the top side 14 and underneath thermovoltaic element 20. Optionally, the sealing layer 26 may include a light-enhancing product, such as micro industrial diamonds (not shown).

Obviously, many variations exist on the type and placement of the electrical wiring and other electrical components of each tile module. One of these many possible electrical connection arrangements is shown schematically in FIG. 1. Circuit 30, which has a negative polarity, and circuit 31, which has a positive polarity, both contain diodes 32 to prevent backflow of electricity in the event of a voltage differential between elements 20 and 22. Hence, the electricity produced from the voltaic elements flows along two separate wires 34 (connected to circuit 30) and 36 (connected to circuit 31). The wires 34 and 36 may be run through channels (not clearly shown, see FIG. 6A) in rigid substrate 12 or sealed to bottom side 16. Wires 34 and 36 then terminate at one end in a male connector 38 and at the other female connector 40. As shown, connectors 38 and 40 are disposed along opposing side edges 18. However, a corner tile module would have connectors extending from perpendicular side edges.

This configuration is especially suited for wall and floor applications of the tile modules 10 because it allows the tiles to interconnect without the need for complex wiring or installation problems due to placement of wires in mortar or grout.

Figure 2A:
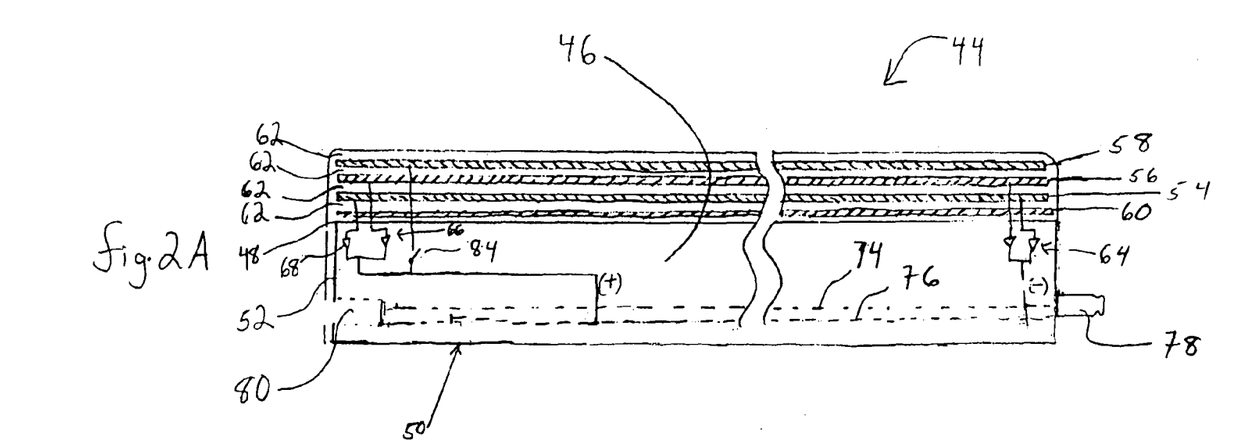
FIG. 2A schematically depicts a side view of a preferred embodiment of the invention.

Turning to FIG. 2A, a second embodiment of the invention featuring an electroluminescent element is shown. Tile module 44 includes a rigid substrate 46 with a top side 48, bottom side 50, and opposing side edges 52. Disposed over top side 48 are thermovoltaic element 54, photovoltaic element 56, and electroluminescent element 58. As discussed above, the electroluminescent element is composed of an electroluminescent material, such as phosphor material, that emits light when a current is passed through it. Optionally, a reflective element 60 is disposed between the thermovoltaic element 54 and the top side 48.

Elements 54, 56 and 58 are separated by a transparent, electrically insulating material (e.g. silicon), which may also act as a sealing layer. In terms of electrical connections, one of many possible arrangements is represented by circuits 64 and 66. Circuit 64 has a negative polarity, while circuit 66 has a positive polarity, with both circuits containing diodes 68 to prevent backflow of electricity in the event of a voltage differential between elements 54, 56, and 58. The electricity produced from the voltaic elements flows to two separate wires 74 and 76 (shown in phantom line). Wires 74 and 76 lead to a male connector 78 and a female connector 80. As shown, connectors 78 and 80 protrude from opposing side edges 52. Also, the flow of electricity to the electroluminescent element 58 is controlled by switch 84 in this case.

Figure 2B:
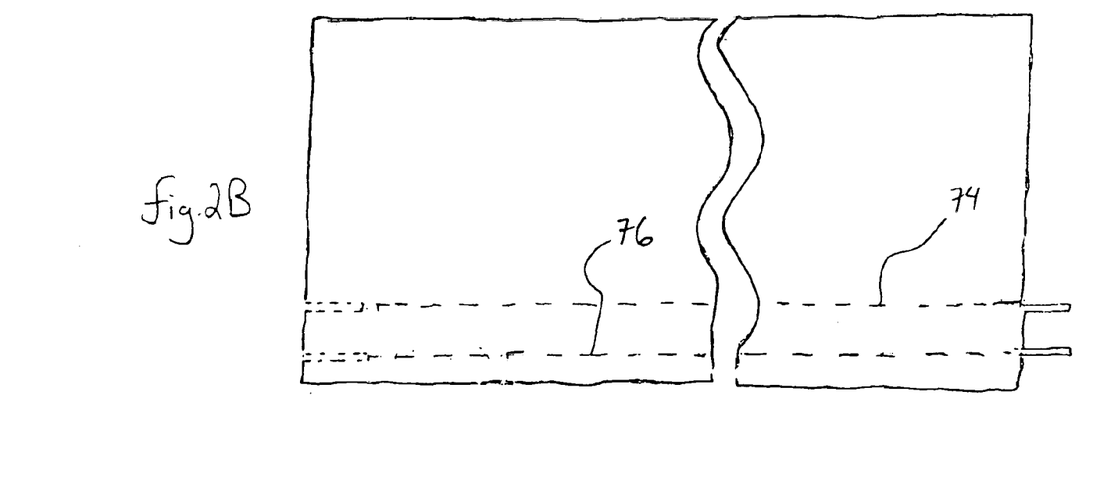
FIG. 2B schematically shows a bottom view of the embodiment of FIG. 2A.

FIG. 2B shows a bottom view of the tile module of FIG. 2A. Thus, the fact that the male connector 78 is made up of two prongs in this case can be seen more clearly.

Figure 3A:
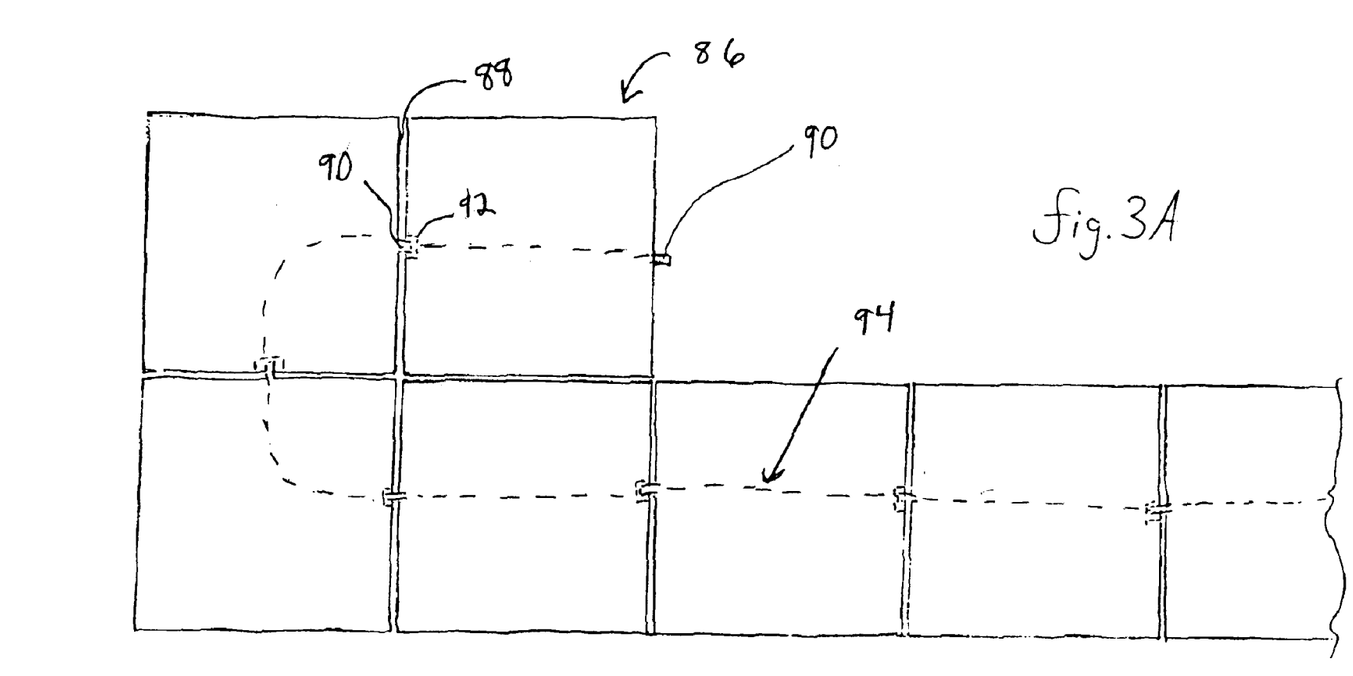
FIG. 3A schematically depicts a top view of a floor or wall application of the tile shown in FIG. 1.
Figure 3B:
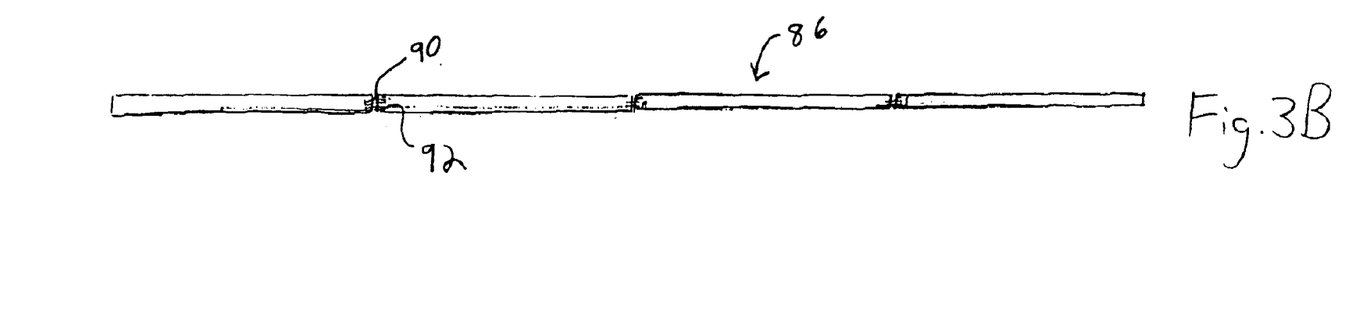
FIG. 3B schematically depicts a side view of four of the tiles shown in FIG. 3A.

A simple floor or wall facade application of the invention is shown in FIGS. 3A (top view) and 3B (side view). Tile modules 86 are connected along a side edge 88 via male connector 90 to female connector 92. Thus, a flow of electricity 94 is established between tiles.

Figure 4:
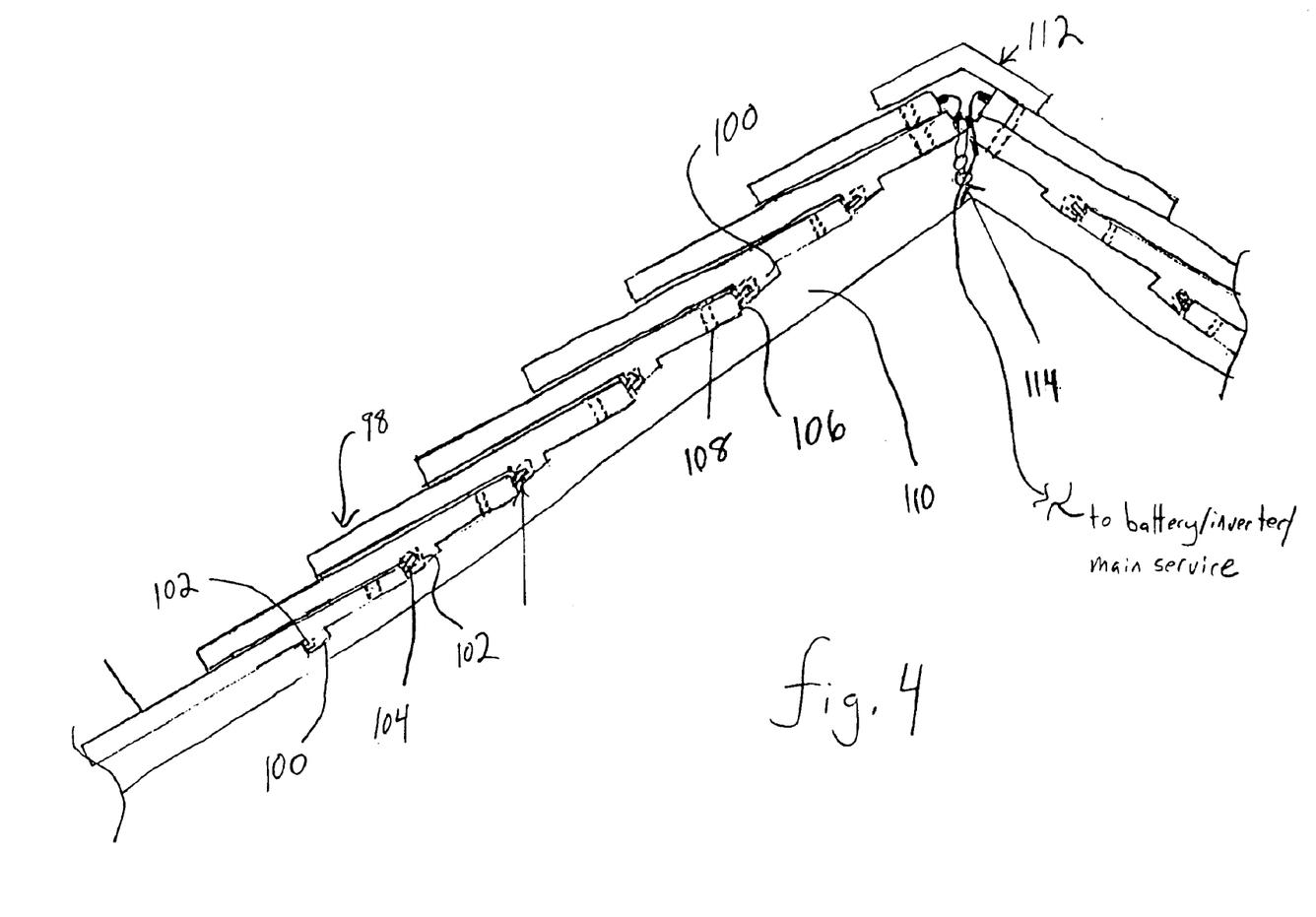
FIG. 4 schematically depicts a side view of a shingle-like roof application of the invention.

A simplified roofing application of the invention is shown in FIG. 4. Tile modules 98 are made so that a bottom tab 100 houses a connector 102 (in this case a female connector) such that frictional engagement of a male connector 104 can be made along a side edge 106 of an adjoining tile. Holes 108 allow each tile 98 to be attached by a nail or screw to a roof substructure 110, if desired. The apex of the pictured roof is preferably covered with a cap piece 112. The exposed connectors 102 and 104 can then be connected by wires 114 to a battery and/or main electrical service.

Figures 5A, 5B:
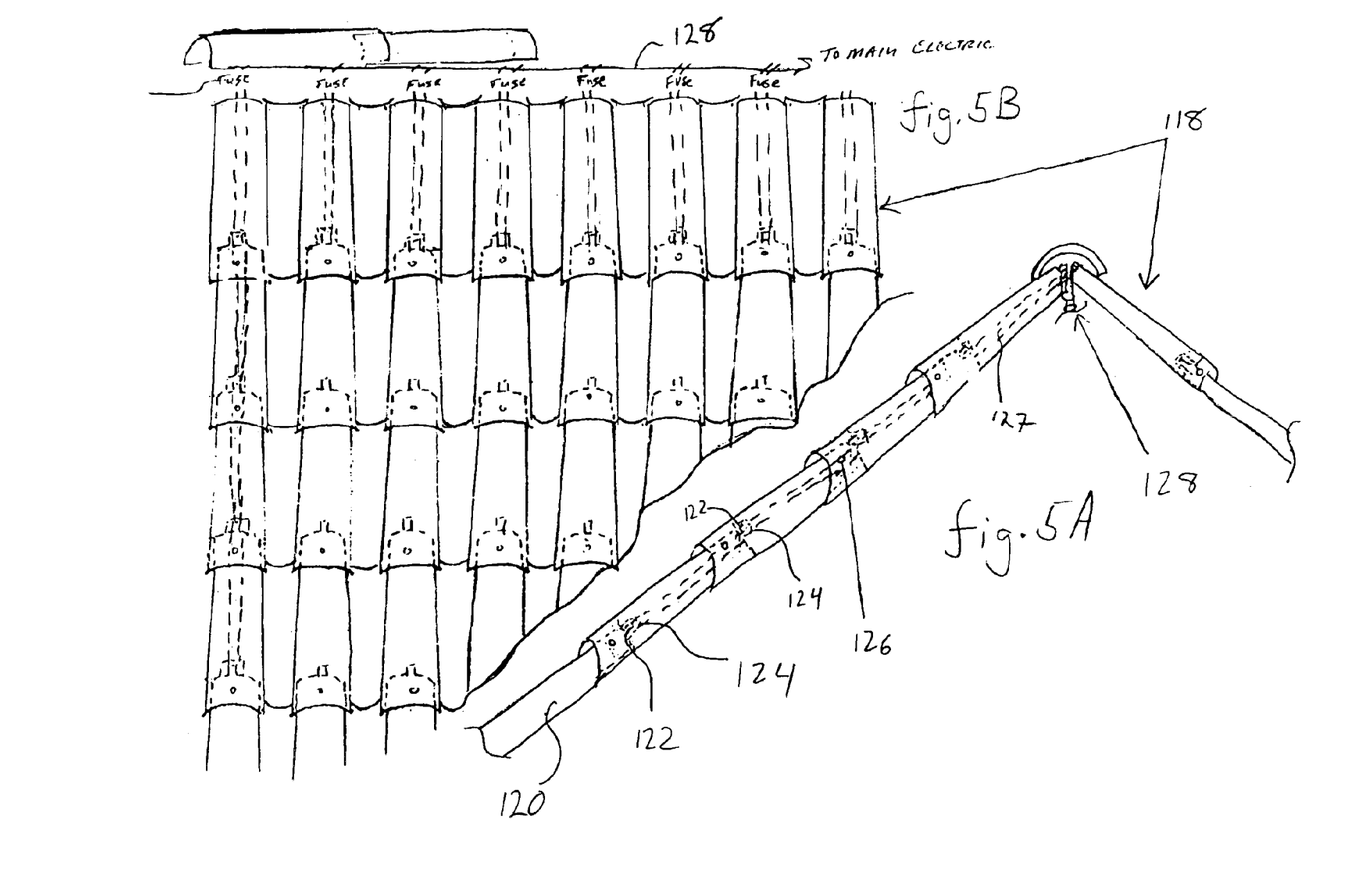
FIG. 5A schematically depicts a front view of a curved tile roof application of the invention.
FIG. 5B schematically depicts in side view of embodiment shown in FIG. 5A.

FIGS. 5A and 5B illustrate in front and side view a roof application of the invention using a tile module that is curved in cross-section. The roof 118 includes tile modules 120, which are interconnected by a male connector 122 coupled to a female connector 124. Each tile may include a hole 126 to facilitate attachment to the roof substructure (not shown). Wires 127 then transmit electricity to a battery or main service through end wires 128.

Figure 6A:
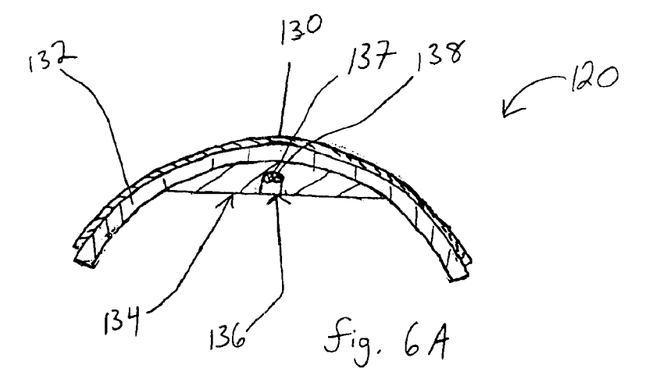
FIGS. 6A and 6B schematically depict a single roof tile of FIG. 5A from a bottom view and in cross-section, respectively.
Figure 6B:
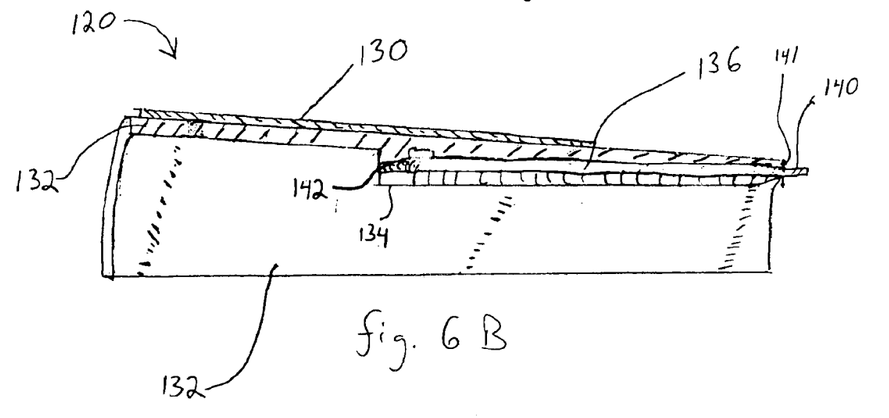

FIGS. 6A and 6B illustrate in a front and side cross-sectional view, respectively, one of the curved roof tile module shown in FIGS. 5A and 5B. Tile 120 has a photovoltaic element 130 disposed over the top of rigid substrate 132. On the bottom of rigid substrate 132, a tab 134 houses channel 136 and wires 137 and 138. Male connector 140 is disposed at side edge 141 while female connector 142 is located within tab 134.

Figure 7:
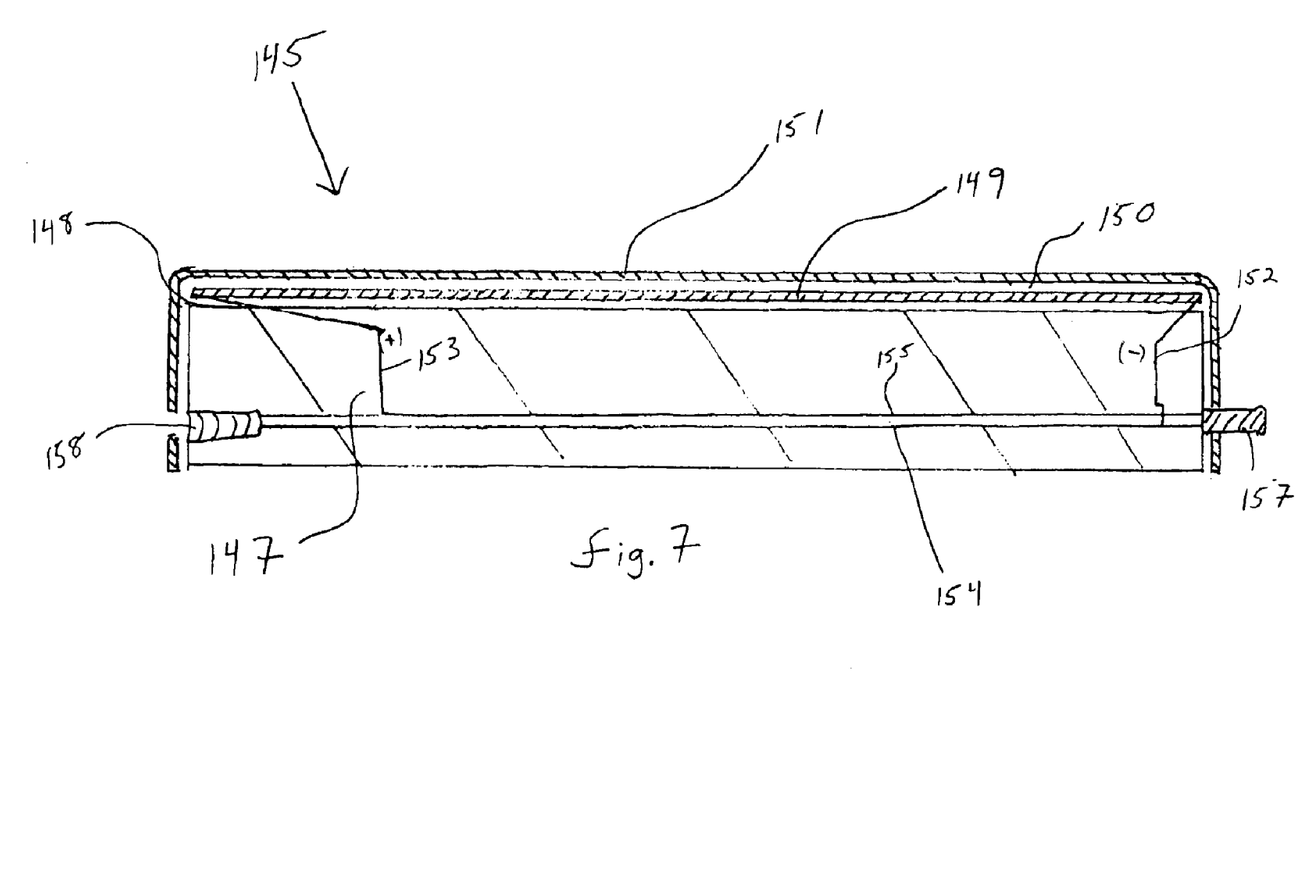
FIG. 7 schematically depicts a basic embodiment of the invention.

FIG. 7 shows a simple embodiment of the multi-use tile module in side cross-section. Tile 145 is made up of rigid substrate 147, having a top side 148. Disposed over top side 148 is electroluminescent element 149. Electrically insulating element 150 and sealing layer 151 coat the electroluminescent element and rigid substrate as described in previous embodiments. Element 151 receives electricity from negative and positive leads 152 and 153, which are connected to wires 154 and 155, respectively. Connectors 157 and 158 allow tile 145 to receive current from an adjoining tile. Of course, designs, letters, or shapes may be made with the electroluminescent element to add a creative element to the tile 145.

It should be noted that the manufacture of the invention may be accomplished by those skilled in the art in several different way. For example, rigid substrate material can be cast or molded and then cured or fired. Circuitry and connecting material is then applied at different points as one or more electric component elements (photovoltaic, thermovoltaic, and/or electroluminescent) are deposed over the rigid substrate. If thin films are used, these films can be deposited on a reflector material (most likely stainless steel) and then laminated to the substrate, or a thin film can be deposited directly on the substrate. At this point, the various sealing coatings or glazes would be applied to the tile, which could then be cured or fired as necessary. Other electric components, such as a battery, inverter, or connecters, would then be installed to complete the tile.

As would be understood by those skilled in the art, any number of functional equivalents may exist in lieu of the preferred embodiments described above. Thus, as will be apparent to those skilled in the art, changes in the details and materials that have been described may be within the principles and scope of the invention illustrated herein and defined in the appended claims.

Accordingly, while the present invention has been shown and described in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent products.

I claim:

1. A multi-use electric tile module, comprising:
   (a) a rigid ceramic substrate having a top side and at least two side edges,
   (b) at least one male connector and at least one female connector integrated respectively into said side edges of said rigid substrate for electrically connecting said rigid substrate to adjoining tile modules; and
   (c) at least one electrical element disposed over the top side of said rigid substrate and electrically connected to said at least two connectors.

2. The tile of claim 1, wherein said electrical element comprises a photovoltaic cell.

3. The tile of claim 1, wherein said electrical element comprises a thermovoltaic cell.

4. The tile of claim 1, wherein said electrical element comprises an electroluminescent material.

5. A floor made up of tiles comprising the tile of claim 1.

6. The tile of claim 1, further including an inverter electrically connected to said tile.

7. The tile of claim 2, wherein said photovoltaic cell comprises a thin film photovoltaic cell.

8. The tile of claim 3, wherein said thermovoltaic cell comprises a thin film thermovoltaic cell.

9. The tile of claim 1, further including a sealing layer disposed over said at least one electrical element, thereby sealing said electrical element to said rigid substrate.

10. The tile of claim 9, wherein said sealing layer is selected from the group consisting of a fired ceramic glaze, a liquid glaze, a sol gel, a thick film, a polymer coating, glass and a combination thereof.

11. The tile of claim 9, wherein said sealing layer further includes micro industrial diamonds.

12. An electric roof tile module, comprising:
   (a) a rigid substrate having a top side, a bottom side, and four side edges connecting said top and bottom sides,
   (b) a tab extending outwardly from the bottom side,
   (c) at least one male connector and at least one female connector for electrically connecting said rigid substrate to another rigid substrate, wherein one of said male and female connectors is housed in said tab and the other of said male and female connectors extends from a front side edge of said tile; and
   (d) at least one electrical element disposed over the top side of said rigid substrate and electrically connected to said at least one male and one female connectors.

13. The roof tile of claim 12, wherein said rigid substrate is curved in cross-section.

14. The roof tile of claim 12, wherein said electrical element comprises a photovoltaic cell.

15. The roof tile of claim 12, wherein said electrical element comprises a thermovoltaic cell.

16. The root tile of claim 12, wherein said electrical element comprises an electroluminescent material.

17. The roof tile of claim 12, further including an inverter electrically connected to said tile.

18. The roof tile of claim 12, wherein said rigid substrate comprises ceramic.

19. The roof tile of claim 14, wherein said photovoltaic cell comprises a thin film photovoltaic cell.

20. The roof tile of claim 15, wherein said thermovoltaic cell comprises a thin film thermovoltaic cell.

21. A roof made from tiles comprising the roof tile of claim 12.

22. The roof tile of claim 12, further including a sealing layer disposed over said at least one electrical element, thereby sealing said electrical component to said rigid substrate.

23. The roof tile of claim 22, wherein said sealing layer is selected from the coup consisting of a fired ceramic glaze, a liquid glaze, a sol gel, a thick film, a polymer coating, glass and a combination thereof.

24. The roof tile of claim 22, wherein said sealing layer further includes micro industrial diamonds.

25. A multi-use electric tile module, comprising:
   (a) a rigid substrate having a top side and at least one side edge,
   (b) at least two connectors integrated into said side edge of said rigid substrate for electrically connecting said rigid substrate to adjoining tile modules; and
   (c) at least one electrical element disposed over the top side of said rigid substrate and electrically connected to said at least two connectors, wherein said electrical element comprises a thermovoltaic cell or an electroluminescent material.

26. A floor made up of tiles comprising the tile of claim 25.

27. The tile of claim 25, wherein said rigid substrate comprises ceramic.

28. The tile of claim 25, further including an inverter electrically connected to said tile.

29. The tile of claim 25, wherein said at least two connectors comprises a female connector and a male connector.

30. The tile of claim 25, wherein said thermovoltaic cell comprises a thin film thermovoltaic cell.

31. The tile of claim 25, further including a sealing layer disposed over said at least one electrical element, thereby sealing said electrical element to said rigid substrate.

32. The tile of claim 31, wherein said sealing layer is selected from the group consisting of a fired ceramic glaze, a liquid glaze, a sol gel, a thick film, a polymer coating, glass and a combination thereof.

33. The tile of claim 31, wherein said sealing layer further includes micro industrial diamonds.

34. A multi-use electric tile module, comprising:
   (a) a rigid substrate formed of a ceramic having a top side and at least one side edge,
   (b) at least two connectors integrated into said side edge of said rigid substrate for electrically connecting said rigid substrate to adjoining tile modules; and
   (c) at least one electrical element disposed over the top side of said rigid substrate and electrically connecting to said at least two connectors.

35. The tile of claim 34, wherein said electrical element comprises a photovoltaic cell, a thermovoltaic cell or an electroluminescent material.

36. The tile of claim 34, further including an inverter electrically connected to said tile.

37. The tile of claim 34, further including a sealing layer disposed over said at least one electrical element, thereby sealing said electrical element to said rigid substrate.

38. The tile of claim 37, wherein said sealing layer is selected from the group consisting of fired a ceramic glaze, a liquid glaze, a sol gel, a thick film, a polymer coating, glass and a combination thereof.

39. The tile of claim 37, wherein said sealing layer further includes micro industrial diamonds.

40. A multi-use electric tile module, comprising:
   (a) a rigid substrate having a top side and at least one side edge,
   (b) at least two connectors integrated into said side edge of said rigid substrate for electrically connecting said rigid substrate to adjoining tile modules;
   (c) at least one electrical element comprising a thin film photovoltaic cell disposed over the top side of said rigid substrate and electrically connected to said at least two connectors; and
   (d) a sealing layer disposed over said at least one electrical element, thereby sealing said electrical element to said rigid substrate, wherein sand sealing layer is selected from the group consisting of a fired ceramic glaze, a liquid glaze, a sol gel, a thick film, a polymer coating, glass and a combination thereof.

41. The tile of claim 40, wherein said sealing layer further includes micro industrial diamonds.

42. The tile of claim 40, further including an inverter electrically connected to said tile.

43. A floor made up of a plurality of electric tile modules, each module comprising:
   (a) a rigid substrate having a top side and at least one side edge,
   (b) at least two connectors integrated into said side edge of said rigid substrate for electrically connecting said rigid substrate to adjoining tile modules; and
   (c) at least one electrical element disposed over the top side of said rigid substrate and electrically connected to said at least two connectors.

44. The tile of claim 43, wherein said electrical element comprises photovoltaic cell, a thermovoltaic cell, or an electroluminescent material.

45. The tile of claim 43, wherein said rigid substrate comprises ceramic.

46. The tile of claim 43, further including an inverter electrically connected to said tile.

47. The tile of claim 43, wherein said at least two connectors comprise a female connector and a male connector.

48. The tile of claim 43, wherein said photovoltaic cell comprises a thin film photovoltaic cell.

49. The tile of claim 43, further including a sealing layer disposed over said at least one electrical element, thereby sealing said electrical element to said rigid substrate.

50. The tile of claim 43, wherein said sealing layer is selected from the group consisting of a fired ceramic glaze, a liquid glaze, a sol gel, a thick film, a polymer coating, glass and a combination thereof.

51. The tile of claim 43, wherein said sealing layer further includes micro industrial diamonds.

* * * * *

UNITED STATES PATENT AND TRADEMARK OFFICE
CERTIFICATE OF CORRECTION

PATENT NO. : 6,928,775 B2 Page 1 of 1
APPLICATION NO. : 10/222483
DATED : August 16, 2005
INVENTOR(S) : Banister It is certified that error appears in the above-identified patent and that said Letters Patent is hereby corrected as shown below:

Claim 23, Col. 8, line 22, "the coup consisting" should be --the group consisting--.
Claim 40, Col. 9, line 28, "wherein sand sealing" should be --wherein said sealing--.

Signed and Sealed this

Tenth Day of February, 2009

JOHN DOLL
*Acting Director of the United States Patent and Trademark Office*